(12) United States Patent
Friedkin et al.

(10) Patent No.: US 9,977,673 B1
(45) Date of Patent: May 22, 2018

(54) SYSTEMS AND METHODS FOR PROVIDING A PLATFORM-SPECIFIC PORTING LAYER FOR MULTI-LEVEL SOFTWARE STACKS

(71) Applicant: Marvell International Ltd., Hamilton (BM)

(72) Inventors: Brian Steven Friedkin, Del Mar, CA (US); Michael David Kellner, Ripon, CA (US); J. Peter Hoddie, Menlo Park, CA (US)

(73) Assignee: Marvell International Ltd., Hamilton (BM)

( * ) Notice: Subject to any disclaimer, the term of this patent is extended or adjusted under 35 U.S.C. 154(b) by 19 days.

(21) Appl. No.: 14/938,488

(22) Filed: Nov. 11, 2015

Related U.S. Application Data

(60) Provisional application No. 62/079,327, filed on Nov. 13, 2014.

(51) Int. Cl.
*G06F 9/44* (2018.01)
*G06F 9/45* (2006.01)

(52) U.S. Cl.
CPC . *G06F 8/76* (2013.01); *G06F 8/40* (2013.01)

(58) Field of Classification Search
CPC .................................... G06F 8/76; G06F 8/51
See application file for complete search history.

(56) References Cited

U.S. PATENT DOCUMENTS

| | | | | |
|---|---|---|---|---|
| 6,356,957 | B2* | 3/2002 | Sanchez, II | 719/316 |
| 8,572,591 | B2* | 10/2013 | Cwalina | G06F 8/447 717/147 |
| 2008/0127169 | A1* | 5/2008 | Malasky | G06F 8/61 717/174 |
| 2009/0313004 | A1* | 12/2009 | Levi | G06F 8/30 703/28 |
| 2013/0339928 | A1* | 12/2013 | Trofin | G06F 9/44521 717/122 |
| 2014/0282372 | A1* | 9/2014 | Araya | G06F 8/447 717/106 |
| 2015/0033202 | A1* | 1/2015 | Wilson | G06F 8/43 717/106 |

* cited by examiner

*Primary Examiner* — Duy Khuong T Nguyen

(57) ABSTRACT

Systems and methods are disclosed for providing a platform-dependent porting layer. The method includes receiving source code, provided by a user, comprising a plurality of generic instructions. The method includes determining a platform type of a target platform for executing the source code. The method includes retrieving, based on the platform type, a porting layer, associated with the target platform, comprising a plurality of platform-specific instructions. The method includes mapping each generic instruction of the plurality of generic instructions to a platform-specific instruction of the plurality of platform-specific instructions.

16 Claims, 3 Drawing Sheets

SYSTEMS AND METHODS FOR PROVIDING A PLATFORM-SPECIFIC PORTING LAYER FOR MULTI-LEVEL SOFTWARE STACKS

CROSS-REFERENCE TO RELATED APPLICATION

This disclosure claims the benefit under 35 U.S.C. § 119(e) of U.S. Provisional Application No. 62/079,327, filed on Nov. 13, 2014, which is incorporated herein by reference in its entirety.

FIELD OF USE

This disclosure is related to systems and methods for enabling the same source code to run on multiple devices and operating systems with different capabilities and configurations.

BACKGROUND OF THE DISCLOSURE

Traditional applications are made by using source code and a compiler to generate executable code. Platform-specific applications are traditionally created by using "make" file instructions and conditional compilation. "Make" file instructions may be specific to a certain platform. The "make" file instructions allow a compiler to generate executable code that is tailored to a specific platform. Similarly, conditions specified during compilation allow the compiler to tailor executable code based on the specified conditions. Both these methods can be challenging because they require complicated instructions to be given for each platform on which the application will be executed.

Furthermore, the source code used to generate executable code may be distributed across many files, making it difficult to identify and maintain the portions that are platform-dependent. Each source code file may contain both platform-dependent and platform-independent portions, making it difficult to update and maintain the source code.

SUMMARY

In accordance with an embodiment of the present disclosure, a method is provided for providing a platform-dependent porting layer. The method may include receiving source code, provided by a user, comprising a plurality of generic instructions. The method may include determining a platform type of a target platform for executing the source code. The method may include compiling a porting layer comprising a plurality of platform-specific instructions with software associated with the platform type of the target platform. The method may include mapping each generic instruction of the plurality of generic instructions to a platform-specific instruction of the plurality of platform-specific instructions.

In some embodiments, the method may include determining a plurality of capabilities of the target platform, and creating the porting layer based on the plurality of capabilities. In some embodiments, the method may include mapping each generic instruction of the plurality of generic instructions to a platform-specific instruction of a second plurality of platform-specific instructions associated with a second target platform. In some embodiments, the method may include executing a compiled version of the source code on the target platform.

In accordance with an embodiment of the present disclosure, a system is provided for providing a platform-dependent porting layer. The system may include control circuitry configured to receive source code, provided by a user, comprising a plurality of generic instructions. The system may include control circuitry configured to determine a platform type of a target platform for executing the source code. The system may include control circuitry configured to compile a porting layer comprising a plurality of platform-specific instructions with software associated with the platform type of the target platform. The system may include control circuitry configured to map each generic instruction of the plurality of generic instructions to a platform-specific instruction of the plurality of platform-specific instructions.

In some embodiments, the system may include control circuitry configured to determine a plurality of capabilities of the target platform, and create the porting layer based on the plurality of capabilities. In some embodiments, the system may include control circuitry configured to map each generic instruction of the plurality of generic instructions to a platform-specific instruction of a second plurality of platform-specific instructions associated with a second target platform. In some embodiments, the system may include control circuitry configured to execute a compiled version of the source code on the target platform.

In some embodiments, the plurality of platform-specific instructions may correspond to instructions defined in a generic architecture. In some embodiments, the porting layer isolates the plurality of platform-specific instructions, and higher layers in a software stack comprise the plurality of generic instructions. In some embodiments, the plurality of platform-specific instructions includes a plurality of function wrappers. In some embodiments, the plurality of platform-specific instructions includes a plurality of indications of capabilities of the target platform. In some embodiments, the plurality of platform-specific instructions includes interface definitions. In some embodiments, the plurality of platform-specific instructions includes data structure definitions.

BRIEF DESCRIPTION OF THE DRAWINGS

Further features of the disclosure, its nature, and various advantages will be apparent upon consideration of the following detailed description, taken in conjunction with the accompanying drawings, in which.

DETAILED DESCRIPTION

To provide an overall understanding of the disclosure, certain illustrative embodiments will now be described, including systems and methods for providing a platform-specific porting layer for multi-layer software stacks. The disclosure allows software developers to treat the porting layer as a build target, thus allowing software developers to use the same build tools and techniques across multiple operating systems and/or devices. This also allows the same application to be run on multiple operating systems and/or devices. The porting layer provides a bridge between an operating system and/or device and the source code layers above. The porting layer typically consists of functions and data structures that completely isolate platform dependencies within the porting layer. The layers above the porting layer in the software stack contain source code that uses the functions and data structures provided by the layers below that layer and the porting layer. The porting layer enables the creation of platform-independent software stacks. The systems and methods described herein may be adapted and modified as is appropriate for the application being addressed, and the systems and methods described herein may be employed in other suitable applications.

Figure 1:
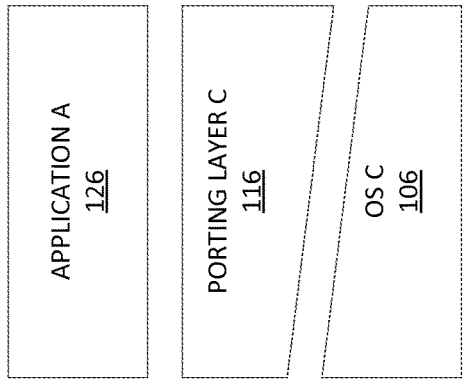
FIG. 1 shows an illustrative block diagram of software stacks for different platforms, in accordance with an embodiment of the present disclosure.
Figure 1:
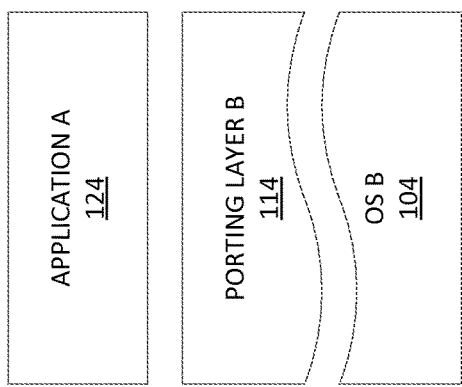
Figure 1:
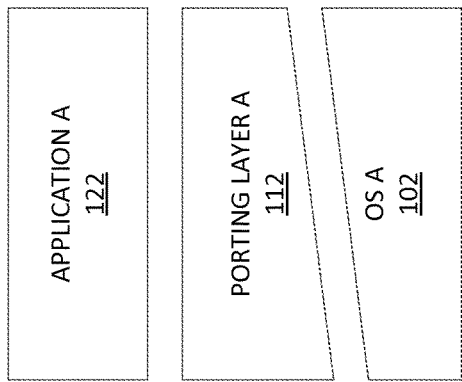

FIG. 1 shows an illustrative block diagram of software stacks for different platforms according to some embodiments of the present disclosure. Software stacks 100 comprise three different software stacks for three different platforms. Although only three software stacks are shown in FIG. 1, it is understood that the present disclosure may be applied to any number of software stacks.

As referred to herein, a software stack includes a set of software layers. A software layer may be a collection of code comprising functions and/or data structures. Each software layer in a software stack may use functions and/or data structures provided by the software layer below it. Each software layer in a software stack may be more abstract that the software layer below it. Each software layer may provide an application programming interface (API) to the software layer above it. Each software layer may have any number of software layers above and below it. A software stack may be comprised of any number of software layers. Each software stack may be associated with a different device and/or operating system.

As referred to herein, a platform includes a target for a software layer. A platform may be an operating system, a device, a software layer, or a combination of these, on top of which a software layer can be built. For example, software stacks 100 depict platforms in the form of operating systems 102, 104, and 106. Each operating system may be associated with a set of functions, data structures, characteristics, supported formats, and other such capabilities.

The different shapes of operating system A 102, operating system B 104, and operating system C 106 visually depict the fact that these operating systems are associated with different functions, data structures, characteristics, supported formats, and other such capabilities. For example, operating system A 102 may be a cell phone operating system, operating system B 104 may be a laptop computer operating system, and operating system C 106 may be a television operating system; each operating system may be associated with its own set of capabilities. Although the lower layers of software stacks 100 are depicted as being different operating systems, it is understood that operating systems 102, 104 and 106 may be any type of platform. For example, the lowest layers in software stacks 100 may be different operating systems. Operating systems 102, 104, and 106 may be different types of computing systems as described in relation to FIG. 3.

In some embodiments, operating systems 102, 104, and 106 may run on devices that support different data types. For example, operating system A 102 may run on a device that supports 16-bit integers, while operating system B 104 may run on a device that supports 32-bit integers. In some embodiments, operating systems 102, 104, and 106 may run on devices that support different endian orders. For example, operating system A 102 may run on a device that supports big endian storage, while operating system B 104 may run on a device that supports little endian storage. In some embodiments, operating system A 102 and operating system B 104 may run on devices that align stored data differently. For example, operating system A 102 may run on a device that aligns data on 8-bit boundaries, while operating system B 104 may run on a device that aligns data on 16-bit boundaries.

In some embodiments, operating systems 102, 104, and 106 may support different types of data structures. For example, operating system A 102 may support pointers while operating system B 104 does not support pointers.

In some embodiments, operating systems 102, 104, and 106 may have different capabilities. For example, operating system A 102 may run on a device that supports floating point numbers while operating system B 104 may run on a device that only supports fixed point integers. In another example, operating system A 102 may support audio output as operating system A 102 may run on a device that is connected to speakers. However, operating system B 104 may not support audio output as operating system B 104 may not run on a device that is connected to speakers. In some embodiments, operating systems 102, 104, and 106 may have different operating systems. For example, operating system A 102 may use a Windows Operating System while operating system B 104 may use a Linux Operating System. In another example, operating system A 102 may run on a device that is capable of connecting to wireless Internet and Bluetooth devices, while operating system B 104 may run on a device that is only capable of connecting to the Internet through an Ethernet cable.

In some embodiments, operating systems 102, 104, and 106 may have different output mechanisms. For example, operating systems 102, 104, and 106 may each be associated with devices with displays with different frame buffer sizes, different refresh rates, different resolutions, different supported colors, or different dimensions. In another example, operating systems 102, 104, and 106 may have audio output capabilities due to being associated with devices with a different number of speakers, different types of speakers, different encodings for audio output, different sampling rates, and different buffer sizes. In some embodiments, operating systems 102, 104, and 106 may each interface with device driver software to control different output mechanisms such as displays and speakers. Porting layers 112, 114, and 116 may interact with device driver software to enable the same application to be executed on devices with different device driver software and/or different output devices.

In some embodiments, operating systems 102, 104, and 106 may support different data structures. For example, operating system A 102 may provide only tree data structures by default, while operating system B 104 may only provide queue data structures by default.

Each operating system in software stacks 100 is associated with a porting layer. For example, operating system A 102 is associated with porting layer A 112, operating system B 104 is associated with porting layer B 114, and operating system C 106 is associated with porting layer C 116. Software stacks 100 may be associated with a software architecture that provides a set of functions and/or data structures that porting layers 112, 114, and 116 must provide. Each porting layer may provide these functions and/or data structures for its respective operating system. Each porting layer 112, 114, and 116 may be compiled with applications 122, 124, and 126, and any other software layers above porting layers 112, 114, and 116, to run on multiple operating systems 102, 104, and 106. Hence, operating systems 102, 104, and 106 may always execute software layers using porting layers 112, 114, and 116.

Porting layers 112, 114, and 116 may be different from each other to allow them to be tailored specifically to operating systems 102, 104 and 106 respectively. For example, each porting layer may be specifically targeted to an operating system and combination of capabilities. However, porting layers 112, 114, and 116 may provide the same functions and/or data structures in accordance with software architecture. Hence, porting layers 112, 114, and 116 may be indistinguishable to higher software layers such as applications 122, 124, and 126. Applications 122, 124, and 126 may all be the same application, or they may be different applications. Porting layers 112, 114, and 116 may be the lowest software layers in software stacks 100, excluding the target platforms such as operating systems 102, 104, and 106. In some embodiments, there may be a one-to-one correspondence between target platforms and porting layers. In some embodiments, an operating system may have multiple porting layers. In some embodiments, a single porting layer may be associated with multiple operating systems.

In some embodiments, porting layers 112, 114, and 116 may be created manually by developers by taking into account capabilities of operating systems 102, 104, and 106. In some embodiments, porting layers 112, 114, and 116 may be provided by operating systems 102, 104, and 106. In some embodiments, porting layers 112, 114, and 116 may be created automatically by a computing system, such as that discussed in relation to FIG. 3, by determining the capabilities of a target platform and then creating a porting layer based on the determination. The porting layer may be created by modifying a generic porting layer to account for the capabilities of the target platform. The generic porting layer may be stored in and retrieved from storage devices 311 of the computing system that creates the porting layer.

Porting layers 112, 114, and 116 may provide functions and/or data structures to standardize the capabilities of operating systems 102, 104, and 106. This may allow the same application to be run on multiple operating systems. For example, porting layers 112, 114, and 116 may define data types for 16-bit integers and 32-bit integers for all devices running operating systems 102, 104, and 106 even if not all devices provide these data types by default. In another example, porting layers 112, 114, and 116 may provide queue data structures for all operating systems 102, 104, and 106 even if these data structures are not supported by default. In another example, porting layers 112, 114, and 116 may provide functions that allow applications 122, 124, and 126 to run as if all data is stored in a big endian format, even if some underlying operating systems run on devices that use a little endian format. In another example, porting layers 112, 114, and 116 may define communication functions that allow applications 122, 124, and 126 to be agnostic towards whether an operating system runs on a devices that is capable of communicating through wireless Internet, wired Internet, or Bluetooth. In another example, porting layers 112, 114, and 116 may define input and output functions that allow applications 122, 124, and 126 to be agnostic towards the display or audio capabilities of each device such as their buffer sizes or encoding formats.

In some embodiments, porting layers 112, 114, and 116 may use function wrappers to standardize the capabilities of operating systems 102, 104, and 106. Porting layers 112, 114, and 116 may combine and modify functions and results of functions provided by operating systems 102, 104, and 106 to create new functions that provide the same results as each other and that are used by applications 122, 124, and 126. For example, porting layer A 112 may need to provide a multiplication function to application A 122 and operating system A 102 may provide an addition function. Porting layer A 112 may include a multiplication wrapper function that performs the addition function provided by operating system A 102 in a loop as many times as required to implement the multiplication function.

In some embodiments, porting layers 112, 114, and 116 may include indications of capabilities of operating systems 102, 104, and 106 and their underlying devices. For example, operating system B 104 may run on a device that does not have Bluetooth capabilities. Porting layer B 114 may include a variable corresponding to Bluetooth capabilities that is set to "False" to indicate that operating system B 104 runs on a device that does not have Bluetooth capabilities. Application A 124 may be able to access the variable to determine if its target platform has Bluetooth capabilities.

In some embodiments, porting layers 112, 114, and 116 may include interface definitions for applications 122, 124, and 126. The interface definitions may include definitions of common functions and/or data structures. The interfaces may be based on the functions and/or data structures provided in generic software architecture. For example, porting layers 112, 114, and 116 may have interface definitions that require that applications 122, 124, and 126 must all define a "quit" function to enable operating systems 102, 104, and 106 to quit the respective applications.

As referred to herein, an application includes software layers defining computer programs that run on lower software layers. Applications 122, 124, and 126 may all be the same application, or may be different applications. Applications 122, 124, and 126 may be able to run on any or all of operating systems 102, 104, and 106. Applications 122, 124, and 126 may include source code and/or executable code. Applications 122, 124, and 126 may use only functions and/or data structures provided by porting layers 112, 114, and 116. Applications 122, 124, and 126 may implement functions and/or data structures defined in interfaces of porting layers 112, 114, and 116. Applications 122, 124, and 126 may be platform-independent, unlike porting layers 112, 114, and 116, which are platform-dependent.

Figure 2:
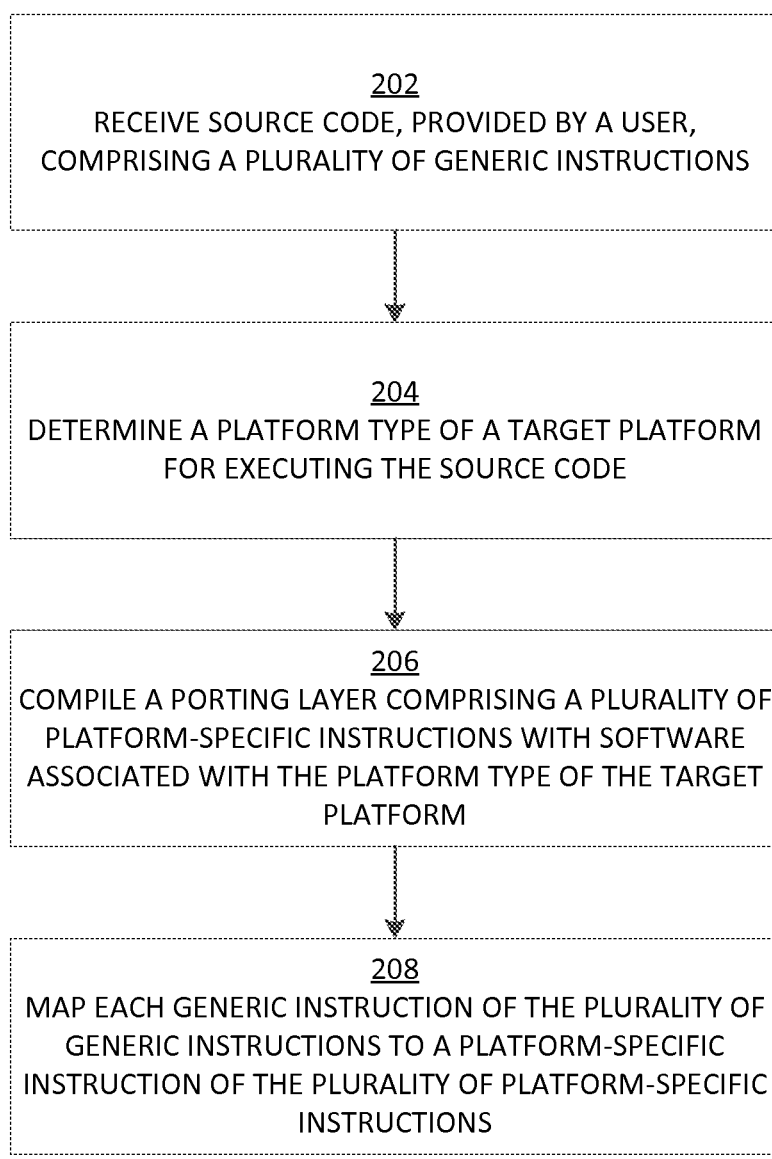
FIG. 2 shows a flow diagram of a process for providing a platform-specific porting layer for multi-layer software stacks, in accordance with an embodiment of the present disclosure.

FIG. 2 shows a flow diagram of process 200 for providing a platform-specific porting layer for multi-layer software stacks, according to some embodiments of the present disclosure. Process 200 may be performed by a software porting device. The software porting device may be a computing device as described in relation to FIG. 3. As referred to herein, a software porting device refers to a system for allowing a platform-independent application to run on a platform. The software porting device may be any device used by a software developer to build a multi-layer stack. Operating systems 102, 104, and 106 may all run on software porting devices.

Process 200 begins at block 202, when the software porting device receives source code, provided by a user, comprising a plurality of generic instructions. In some embodiments, the user may be a software developer. The source code may be received through input/output controller 310. The plurality of generic instructions may be part of a platform-independent application such as one of applications 122, 124, and 126.

Process 200 proceeds to block 204, when the software porting device determines a platform type of a target platform for executing the source code. The software porting device may determine the platform type based on user input received using input/output controller 310 that selects a particular device and/or operating system to be the target platform. The platform type may include a device and/or operating system of the target platform. The software porting device may determine the platform type of the target platform based on input from a user or a software developer. The target platform will execute the source code after the source code has been compiled. The software porting device will compile the source code with a porting layer that is associated with the target platform. This allows the source code received from the user to be executed on the target platform without modification.

Process 200 proceeds to block 206, when the software porting device compiles a porting layer comprising a plurality of platform-specific functions with a software associated with the platform type of the target platform. The software porting device may compile code by turning source code into executable code. In some embodiments, the software associated with the platform type of the target platform may be any combination of the operating system of the target platform, operating system code associated with the target platform, any other software layer on top of which the porting layer will run, and/or application code. In some embodiments, the porting layer may be similar to porting layers 112, 114, and 116. In some embodiments, porting layers 112, 114, and 116 may be compiled together with applications 122, 124, and 126. In some embodiments, porting layers 112, 114, and 116 may be compiled together with any software layers above them in a software stack to enable the upper software layers to run on multiple devices and/or operating systems.

In some embodiments, the platform type of the target platform may be associated with more than one software, and the software porting device may select a porting layer associated with one software to compile. For example, operating system 102 may comprise two partitions, one of which has a Linux operating system and one of which has a Windows operating system. The software porting device may select the Linux operating system to compile a first porting layer for. The software porting device may select the Windows operating system to compile a second porting layer for. Operating system 102 may then be able to execute the same application on both partitions due to their respective porting layers.

For example, the software porting device may receive source code provided by a user that uses a generic instruction to display information on a display screen of a device associated with operating system A 102. The software porting device may also receive user input indicating that the target platform is operating system A 102. The software porting device may use the user input to determine that the platform type of operating system A 102 is "cell phone operating system". Operating system A 102 may include binary code associated with the platform type of "cell phone operating system." The operating system binary code may allow operating system A 102 to perform default functions such as send and receive calls, send and receive text messages, and display text messages to users. The porting layer for operating system A 102 may contain instructions that modify features specific to the "cell phone operating system" platform type such as a frame buffer size of the display, a screen resolution, supported colors, refresh rate, and other such information associated with operating system A 102 into features that are compatible with any of applications 122, 124, and 126. The software porting device may compile the porting layer with an application that will run on the operating system binary code associated with platform type "cell phone operating system" of operating system A 102. The software porting device may map the generic display instructions in the compiled version of the user-provided source code to the instructions provided by the compiled porting layer.

In some embodiments, the software porting device may have determined the capabilities of the target platform and created a porting layer based on the capabilities. In some embodiments, the porting layer may be created by retrieving a template porting layer and modifying it based on the capabilities of the target platform. The capabilities of the target platform are further described above in relation to FIG. 1. In some embodiments, the structure of the porting layer, as well as the functions and/or data structures it defines, is provided by a generic software architecture that applies to multiple porting layers.

Process 200 proceeds to block 208 when the software porting device maps each generic instruction of the plurality of generic instructions to a platform-specific instruction of the plurality of platform-specific instructions. The plurality of platform-specific instructions may be part of the porting layer associated with the target platform. The porting layer may be similar to porting layers 112, 114, and 116. In some embodiments, mapping may comprise compiling the source code, the porting layer for the operating system associated with the platform type together to create executable code that can be executed on the target platform. In some embodiments, mapping may comprise cross-referencing the compiled version of the received source code with the compiled porting layer to ensure all functions and/or data structures required by the compiled version of the received source code are present in the compiled porting layer and vice versa.

In some embodiments, the platform-specific instructions may adhere to a generic software architecture used by the generic instructions as well. For example, multiple porting layers 112, 114, and 116 for different operating systems 102, 104, and 106 may have different platform-specific instructions for display functions. All porting layers 112, 114, and 116 may adhere to a generic software architecture that requires each display function to be named "display( )". The generic instructions in the received source code may use this display function. The software porting device may perform the mapping by linking the compiled generic "display( )" instruction in the received code to each platform-specific "display( )" function provided by porting layers 112, 114, and 116. The platform-specific "display( )" functions provided by porting layers 112, 114, and 116 may take into account the variations between operating systems with regards to frame buffer sizes of the displays, screen resolutions, supported colors, and refresh rates.

In some embodiments, a generic instruction may be mapped to more than one platform-specific instruction. In some embodiments, multiple generic instructions may be mapped to a single platform-specific instruction.

In some embodiments, the software porting device may then execute the compiled version of the received source code on the target platform. In some embodiments, the software porting device may then compile the received source code with a second porting layer so that the compiled code can be executed on a second target platform.

Figure 3:
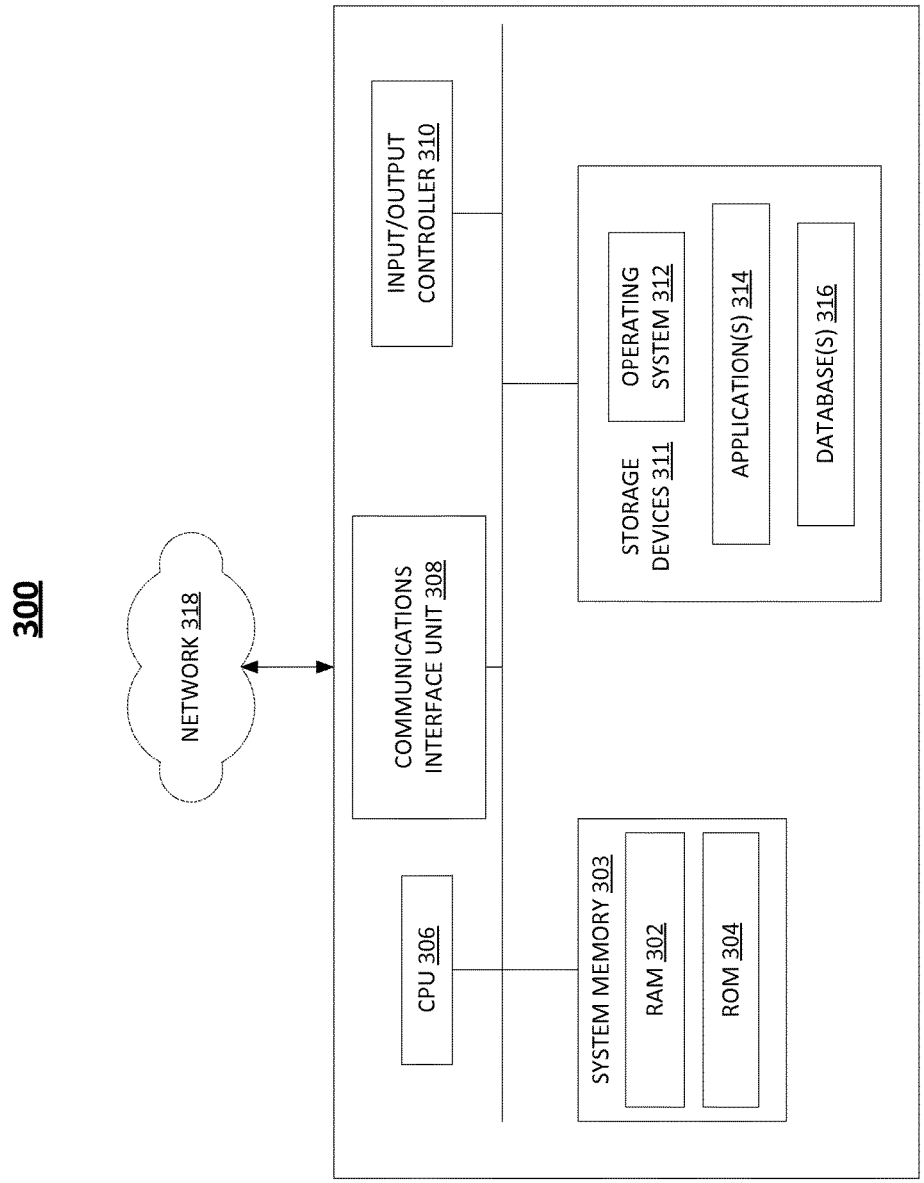
FIG. 3 shows a block diagram of a computing device for performing any of the processes described herein, in accordance with an embodiment of the present disclosure.

FIG. 3 is a block diagram 300 of a computing device, such as devices 102, 104, and 106 described in relation to FIG. 1, or the software porting device described in relation to FIG. 2, for performing any of the processes described herein, in accordance with an embodiment of the disclosure. Computing device 300 may include a software porting device, or any device associated with operating systems 102, 104, and 106. Each of the components of these systems may be implemented on one or more computing devices 300. In certain aspects, a plurality of the components of these systems may be included within one computing device 300. In certain embodiments, a component and a storage device 311 may be implemented across several computing devices 300.

The computing device 300 comprises at least one communications interface unit 308, an input/output controller 310, system memory 303, and one or more data storage devices 311. The system memory 303 includes at least one random access memory (RAM 302) and at least one read-only memory (ROM 304). All of these elements are in communication with a central processing unit (CPU 306) to facilitate the operation of the computing device 300. The computing device 300 may be configured in many different ways. For example, the computing device 300 may be a conventional standalone computer or, alternatively, the functions of computing device 300 may be distributed across multiple computer systems and architectures. In FIG. 3, the computing device 300 is linked, via network 318 or local network, to other servers or systems.

The computing device 300 may be configured in a distributed architecture, wherein databases and processors are housed in separate units or locations. Some units perform primary processing functions and contain at a minimum a general controller or a processor and a system memory 303. In distributed architecture embodiments, each of these units may be attached via the communications interface unit 308 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to Ethernet, SAP, SAS™, ATP, BLUETOOTH™, GSM and TCP/IP. Computing device 300 may use communications interface unit 308 to retrieve and receive data from a remote location.

The CPU 306 comprises a processor comprising control circuitry, such as one or more conventional microprocessors and one or more supplementary co-processors such as math co-processors for offloading workload from the CPU 306. Control circuitry may be used to run software and implement the disclosure described here. The CPU 306 is in communication with the communications interface unit 308 and the input/output controller 310, through which the CPU 306 communicates with other devices such as other servers, user terminals, or devices. The communications interface unit 308 and the input/output controller 310 may include multiple communication channels for simultaneous communication with, for example, other processors, servers or client terminals.

The CPU 306 is also in communication with the data storage device 311 comprising storage circuitry. The data storage device 311 may comprise an appropriate combination of magnetic, optical or semiconductor memory, and may include, for example, RAM 302, ROM 304, a flash drive, an optical disc such as a compact disc or a hard disk or drive. The CPU 306 and the data storage device 311 each may be, for example, located entirely within a single computer or other computing device, or connected to each other by a communication medium, such as a USB port, serial port cable, a coaxial cable, an Ethernet cable, a telephone line, a radio frequency transceiver or other similar wireless or wired medium or combination of the foregoing. For example, the CPU 306 may be connected to the data storage device 311 via the communications interface unit 308. The CPU 306 may be configured to perform one or more particular processing functions.

In some embodiments, storage device 311 may store a database including unique identifiers for different platform types and locations of porting layers associated with each platform type. The software porting device may cross-reference the database using a unique device identifier to identify a location of a porting layer. In some embodiments, storage device 311 may include one or more porting layers for computing device 300. In some embodiments, storage device 311 may include a database of unique platform type identifiers of different devices such as devices 102, 104, and 106. In some embodiments, the information above may be stored in network 318.

The data storage device 311 may store, for example, (i) an operating system 312 for the computing device 300; (ii) one or more applications 122, 124, 126, and 314 (e.g., computer program code or a computer program product) adapted to direct the CPU 306 in accordance with the systems and methods described here, and particularly in accordance with the processes described in detail with regard to the CPU 306; or (iii) database(s) 316 adapted to store information that may be utilized to store information required by the program.

In some embodiments, data storage device 311 may store applications and application identifiers as described above. In some embodiments, applications 314 may include applications 122, 124, and 126, and may require a porting layer to be executed on computing device 300. In some embodiments, operating system 312 may be a target platform of applications 314.

The operating system 312 and applications 314 may be stored, for example, in a compressed, an uncompiled, and an encrypted format, and may include computer program code. The instructions of the program may be read into a main memory of the processor from a computer-readable medium other than the data storage device 311, such as from the ROM 304 or from the RAM 302. While execution of sequences of instructions in the program causes the CPU 306 to perform the process steps described herein, hard-wired circuitry may be used in place of, or in combination with, software instructions for embodiment of the processes of the present disclosure. Thus, the systems and methods described are not limited to any specific combination of hardware and software.

Suitable computer program code may be provided for performing one or more functions in relation to determining a decoding order of a SIC receiver as described herein. The program also may include program elements such as an operating system 312, a database management system and "device drivers" that allow the processor to interface with computer peripheral devices (e.g., a video display, a keyboard, a computer mouse, a touchscreen, a microphone, a camera, a speaker, headphones etc.) via the input/output controller 310.

The term "computer-readable medium" as used herein refers to any transitory or non-transitory medium that provides or participates in providing instructions to the processor of the computing device 300 (or any other processor of a device described herein) for execution. Such a medium may take many forms, including, but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer may read.

Various forms of computer-readable media may be involved in carrying one or more sequences of one or more instructions to the CPU 306 (or any other processor of a device described herein) for execution. For example, the instructions may initially be borne on a magnetic disk of a remote computer (not shown). The remote computer may load the instructions into its dynamic memory and send the instructions over an Ethernet connection, cable line, or even telephone line using a modem. A communications device local to a computing device 300 (e.g., a server) may receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above described embodiments of the present disclosure are presented for purposes of illustration and not of limitation, and the present disclosure is limited only by the claims that follow.

What is claimed is:

1. A method for providing a platform-dependent porting layer, the method comprising:
    receiving source code, provided by a user, comprising a plurality of generic instructions associated with a template porting layer associated with a plurality of platform types, wherein the template porting layer is configured to be modified to comprise a plurality of platform-specific instructions associated with a platform type of the plurality of platform types;
    determining a platform type of a target platform for executing the source code;
    retrieving, from a database, the template porting layer associated with the plurality of platform types, wherein the plurality of platform types includes the platform type of the target platform;
    modifying a feature parameter of the template porting layer based on capabilities of the platform type into a modified feature parameter that is compatible with an application running on the target platform by:
        in response to determining that a required operation for generating the modified feature parameter is unavailable from the target platform, identifying at least one operation supported by the target platform as an intermediate operation to indirectly achieve a same result with the required operation;
        combining the at least one operation supported by the target platform and a result generated by the at least one operation to provide a new operation corresponding to the required operation in a form of a function wrapper that is executable via the plurality of platform-specific instructions by the target platform;
    compiling the modified porting layer comprising a plurality of platform-specific instructions with software associated with the platform type of the target platform;
    mapping each generic instruction of the plurality of generic instructions to a platform-specific instruction of the plurality of platform-specific instructions; and
    executing, via a processor corresponding to the target platform, a compiled version of the source code on the target platform.

2. The method of claim 1, wherein the plurality of platform-specific instructions corresponds to instructions defined in a generic architecture.

3. The method of claim 1, further comprising:
    determining the capabilities of the target platform based on the platform type.

4. The method of claim 1, further comprising mapping each generic instruction of the plurality of generic instructions to a platform-specific instruction of a second plurality of platform-specific instructions associated with a second target platform.

5. The method of claim 1, wherein the porting layer isolates the plurality of platform-specific instructions, and higher layers in a software stack comprise the plurality of generic instructions.

6. The method of claim 1, wherein the plurality of platform-specific instructions includes a plurality of indications of the capabilities of the target platform.

7. The method of claim 1, wherein the plurality of platform-specific instructions includes interface definitions.

8. The method of claim 1, wherein the plurality of platform-specific instructions includes data structure definitions.

9. A system for providing a platform-dependent porting layer, the system comprising control circuitry configured to:
    receive source code, provided by a user, comprising a plurality of generic instructions associated with a template porting layer associated with a plurality of platform types, wherein the template porting layer is configured to be modified to comprise a plurality of platform-specific instructions associated with a platform type of the plurality of platform types;
    determine, using a processor, a platform type of a target platform for executing the source code;
    retrieve, from a database, the template posting layer associated with the plurality of platform types, wherein the plurality of platform types includes the platform type of the target platform;
    modify, using the processor, a feature parameter of the template porting layer based on capabilities of the platform type into a modified feature parameter that is compatible with an application running on the target platform by:
        in response to determining that a required operation for generating the modified feature parameter is unavailable from the target platform, identifying at least one operation supported by the target platform as an intermediate operation to indirectly achieve a same result with the required operation;

combining the at least one operation supported by the target platform and a result generated by the at least one operation to provide a new operation corresponding to the required operation in a form of a function wrapper that is executable via the plurality of platform-specific instructions by the target platform;

compile, using the processor, the modified porting layer comprising a plurality of platform-specific instructions with software associated with the platform type of the target platform;

map, using the processor, each generic instruction of the plurality of generic instructions to a platform-specific instruction of the plurality of platform-specific instructions; and execute, via a processor corresponding to the target platform, a compiled version of the source code on the target platform.

10. The system of claim 9, wherein the plurality of platform-specific instructions corresponds to instructions defined in a generic architecture.

11. The system of claim 9, wherein the control circuitry is further configured to:
   determine the capabilities of the target platform based on the platform type.

12. The system of claim 9, wherein the control circuitry is further configured to map each generic instruction of the plurality of generic instructions to a platform-specific instruction of a second plurality of platform-specific instructions associated with a second target platform.

13. The system of claim 9, wherein the porting layer isolates the plurality of platform-specific instructions, and higher layers in a software stack comprise the plurality of generic instructions.

14. The system of claim 9, wherein the plurality of platform-specific instructions includes a plurality of indications of the capabilities of the target platform.

15. The system of claim 9, wherein the plurality of platform-specific instructions includes interface definitions.

16. The system of claim 9, wherein the plurality of platform-specific instructions includes data structure definitions.

* * * * *